Dec. 13, 1927.  1,652,475
A. W. HAISS
TRACTION DRIVING AND POWER TAKE-OFF MECHANISM
Filed Dec. 5, 1924
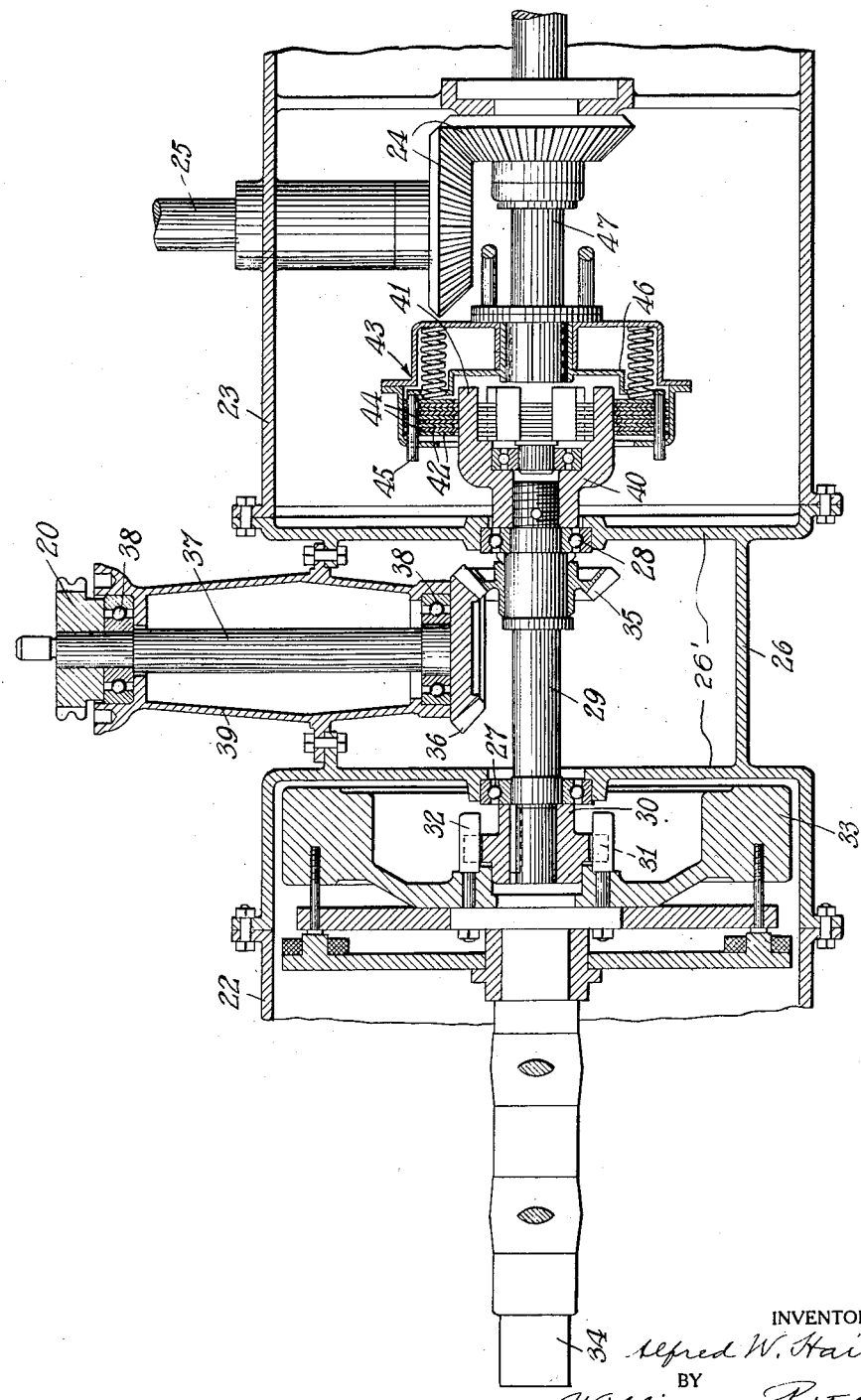
INVENTOR
Alfred W. Haiss
BY
Williams & Pritchard
ATTORNEYS Patented Dec. 13, 1927.

1,652,475

UNITED STATES PATENT OFFICE.

ALFRED W. HAISS, OF NEW YORK, N. Y., ASSIGNOR TO GEORGE HAISS MANUFACTURING CO. INC., OF NEW YORK, N. Y., A CORPORATION OF NEW YORK.

TRACTION DRIVING AND POWER TAKE-OFF MECHANISM.

Application filed December 5, 1924. Serial No. 754,011.

This invention relates to traction driving and power take-off mechanism.

In wagon loaders employing a well known type of tractor as a means for transporting the loader from place to place, for moving the same gradually or progressively into the pile of material to be loaded and for operating the elevator mechanism it has been found desirable to effect the progressive movement into the pile of material by maintaining the reversing gears of the tractor transmission in mesh and controlling the backward or reverse movement of the tractor by intermittently connecting and disconnecting the clutch as desired. In a wagon loader so operated it is desirable to maintain continuous operation of the elevating mechanism both while the loader is being progressively moved into the pile of material to be loaded and while the loader is at rest. Such operation is impossible, however, in the case of certain types of tractors when the elevator mechanism depends for its operation upon the transmission of power from the tractor power plant through the usual take-off pulley or sprocket for the reason that the clutch is arranged intermediate the power plant and the take-off pulley or sprocket and consequently when the clutch is released or disengaged to discontinue the progressive movement the operation of the elevator mechanism is likewise discontinued.

An important object of my invention is to provide an improved driving and power take-off mechanism for use in connection with a wagon loader whereby the above mentioned desired operation thereof may be accomplished.

Other objects and certain advantages of the invention will become apparent from the following description when taken in connection with the accompanying drawing which is a horizontal sectional view through the modified form of driving and take-off mechanism.

In the form of tractor driving mechanism herein illustrated, the flywheel housing 22 is adapted, in the absence of the modified form of traction driving and take-off mechanism embodying my invention, to be connected or coupled directly to the clutch and gear housing 23 within the latter of which it is customary to house the usual clutch arranged intermediate the power plant and the usual pair of gears 24, adapted to drive the power take-off shaft 25, to which the usual take-off pulley, not shown, is connected. If in such an arrangement the take-off pulley, not shown, were connected to the conveyor of a wagon loader, it is obvious that such conveyor would fail to operate upon release of the usual clutch mechanism. By the modified form of traction driving and take-off mechanism, embodying my invention, I have made it possible to continue operation of a take-off sprocket 20 regardless of whether the clutch is released or not and consequently I have thus provided for the operation of the conveyor mechanism of a wagon loader both while the loader is being backed into a pile of material to be loaded and while the loader is at rest. In carrying out my invention I provide an intermediate or auxiliary housing indicated by the numeral 26, opposite ends of the housing being adapted for connection respectively to the housings 22 and 23 as shown in the drawing. This intermediate housing is formed with bearing plates or supports 26' which close the ends of the housings 22 and 23 and support bearings 27 and 28 within which is mounted an auxiliary drive shaft 29, to one end of which is keyed a hub 30 carrying a plurality of arms 31 adapted to engage a plurality of driving pins 32 carried by the engine flywheel 33, thereby establishing a positive driving connection between the drive shaft 29 and the engine crank shaft 34, to which the flywheel 33 is connected.

The drive shaft 29 is provided adjacent the bearing 28 with a bevel gear 35 meshing with a similar gear 36 carried by a power take-off shaft 37 supported within suitable bearings 38 carried within a power take off housing 39, suitably connected to and extending from the intermediate housing 26. This take-off shaft carries a take-off sprocket 20 which is adapted to be connected to the conveyor of a wagon loader through a suitable train of sprockets and sprocket chains not shown.

The driving shaft 29 projects through the housing 26 and into the housing 23 and carries a hub 40 provided with a plurality of fingers 41 corresponding to the fingers 32 hereinbefore mentioned. The fingers 41 are adapted to cooperate with a plurality of discs 42 constituting the driving elements of the conventional type of multiple disc clutch indicated as a whole by the numeral 43. In this clutch the usual complementary set of discs 44 are employed through which project a plurality of pins 45 carried by the driven element 46 of the clutch, which driven element is in turn connected to the main or original drive shaft 47 of the tractor, from which shaft the usual power take-off shaft 25 derives its power of rotation through the intermeshing gears 24.

In the absence of the supplemental or modified traction driving and power take-off mechanism, herein shown, the housings 22 and 23, as above described, would be connected directly to each other in which case the clutch 43 as a whole would be housed within the flywheel 33 and the driving fingers 32 carried by this flywheel would, in accordance with usual practice, cooperate with the discs 42 in the same manner that the fingers 41, constituting an element of the structure embodying my invention, are employed to cooperate with the discs 42.

The clutch 43 herein shown being of standard and well known construction, it goes without saying that the same may be associated with and adapted to cooperate with a suitable clutch operating device not shown located exteriorly of the housing 23 in accordance with usual practice.

From an inspection of the drawing when taken in connection with the foregoing description, it will be readily appreciated that the power sprocket 20, so long as the engine 21 is kept in operation, continues to rotate regardless of whether or not the main shaft 47 is connected with the auxiliary shaft 29 through the instrumentality of the clutch 43. This being the case, the reversing gears of the tractor transmission, not shown, may be maintained in mesh at all times without in any way affecting the operation of the power take-off sprocket 20.

Under certain conditions it may be desirable to discontinue the operation of the power take-off sprocket 20 and to this end a suitable clutch mechanism, not shown, may be provided as will be readily understood to operatively connect the take-off sprocket 20 with the shaft 37 or disconnect the sprocket from the same.

Having thus described my invention I claim:

1. In a tractor driving mechanism, a power plant having a crank shaft, a fly wheel connected to the crank shaft and provided with a plurality of projecting pins, a main drive shaft, a clutch having a driven member connected to said main drive shaft and a driving member adapted to be operatively connected to said driven member, an auxiliary drive shaft; a plurality of arms carried by said auxiliary shaft and adapted to engage said pins, and a plurality of fingers carried by said auxiliary shaft and adapted to engage said driving member.

2. In a tractor driving mechanism, a power plant having a crank shaft, a fly wheel connected to the crank shaft and provided with a plurality of projecting pins, a main drive shaft, a clutch having a driven member connected to said main drive shaft and a driving member adapted to be operatively connected to said driven member, an auxiliary drive shaft; a plurality of arms carried by said auxiliary shaft and adapted to engage said pins, a plurality of fingers carried by said auxiliary shaft and adapted to engage said driving member, and a power take-off mechanism operatively connected to said auxiliary drive shaft intermediate said clutch and said crank shaft.

In testimony whereof, I have affixed my signature to this specification.

ALFRED W. HAISS.